(12) United States Patent 
Palenska et al.

(10) Patent No.: US 12,693,369 B2 
(45) Date of Patent: Jul. 28, 2026

(54) SYSTEMS AND METHODS FOR ADS-B VALIDATION USING VEHICLES

(71) Applicant: Honeywell International Inc., Charlotte, NC (US)

(72) Inventors: Marketa Palenska, Brno (CZ); Petr Casek, Brno (CZ); Lubos Korenciak, Varan (SK)

(73) Assignee: Honeywell International Inc., Charlotte, NC (US)

( * ) Notice: Subject to any disclaimer, the term of this patent is extended or adjusted under 35 U.S.C. 154(b) by 106 days.

(21) Appl. No.: 18/776,581

(22) Filed: Jul. 18, 2024

(65) Prior Publication Data

US 2026/0023149 A1 Jan. 22, 2026

(51) Int. Cl. 
*G01S 5/02* (2010.01)
(52) U.S. Cl. 
CPC .......... *G01S 5/0244* (2020.05); *G01S 5/0215* (2013.01); *G01S 5/02216* (2020.05); (Continued)
(58) Field of Classification Search 
CPC .. G01S 5/0244; G01S 5/0215; G01S 5/02216; G01S 5/0249; G01S 5/0289; G01S 2201/06; G01S 2201/08 
See application file for complete search history.

(56) References Cited

U.S. PATENT DOCUMENTS 6,400,320 B1 * 6/2002 Stilp ..................... H04W 64/00 
342/457 
9,052,375 B2 6/2015 Sampigethaya et al. 
(Continued)

FOREIGN PATENT DOCUMENTS

CN 105929416 B 11/2018 
CN 114666723 A * 6/2022 ............ H04W 4/025 
(Continued)

OTHER PUBLICATIONS

Machine translation downloaded from IP.com of CN 114666723 translated Dec. 24, 2025 (Year: 2025).* 
(Continued)

*Primary Examiner* — Kito R Robinson 
*Assistant Examiner* — Tanya C Sienko 
(74) *Attorney, Agent, or Firm* — Fogg & Powers LLC

(57) ABSTRACT

A method of validating ADS-B is described herein. The method includes receiving, from time synchronized vehicles, ADS-B data (identifier, horizontal position information, and altitude information for a first vehicle) with a timestamp (defining a time of reception of the ADS-B message). The method includes receiving, from each vehicle, a determined position at the time of reception of the ADS-B message. The method includes determining differences in time of arrival for the ADS-B message to each vehicle, extracting altitude information from the ADS-B data, and determining an estimated horizontal position of the first vehicle based on the differences in time of arrival, the determined positions received from each vehicle, and the extracted altitude information. The method includes determining whether the horizontal position information in the ADS-B message is valid based on a comparison of the estimated horizontal position of the first vehicle and the horizontal position information in the ADS-B message.

20 Claims, 6 Drawing Sheets

(52) U.S. Cl.
CPC .......... *G01S 5/0249* (2020.05); *G01S 5/0289* (2013.01); *G01S 2201/06* (2019.08); *G01S 2201/08* (2019.08)

(56) References Cited

U.S. PATENT DOCUMENTS

| | | | | |
|---|---|---|---|---|
| 10,094,671 | B2 * | 10/2018 | Kondo | G01C 21/30 |
| 10,859,666 | B1 * | 12/2020 | Kratz | H04W 56/002 |
| 11,061,106 | B2 * | 7/2021 | Hedley | G01S 5/14 |
| 11,158,198 | B1 | 10/2021 | Beard | |
| 11,346,919 | B2 | 5/2022 | Neufeldt et al. | |
| 11,598,836 | B2 * | 3/2023 | Hsu | G01S 5/011 |
| 11,682,310 | B2 | 6/2023 | Pennapareddy | |
| 12,174,307 | B2 * | 12/2024 | Kratz | G01S 5/0215 |
| 12,366,627 | B2 * | 7/2025 | Bergen | G01S 5/0242 |
| 2007/0252760 | A1 | 11/2007 | Smith et al. | |
| 2011/0057830 | A1 | 3/2011 | Sampigethaya et al. | |
| 2022/0007147 | A1 * | 1/2022 | König | G01S 5/02213 |
| 2024/0205873 | A1 * | 6/2024 | Amini | H04W 64/003 |

FOREIGN PATENT DOCUMENTS

| | | | | |
|---|---|---|---|---|
| CN | 112671496 | B | 12/2022 | |
| CN | 113301508 | B | 12/2022 | |
| CN | 117311131 | A | 12/2023 | |
| EP | 3154046 | A1 * | 4/2017 | H04L 63/108 |
| EP | 3088911 | B1 | 3/2019 | |
| EP | 3499989 | A1 * | 6/2019 | G01S 5/14 |
| EP | 3154046 | B1 | 8/2021 | |
| EP | 3499989 | B1 * | 10/2021 | G01S 5/0242 |
| EP | 3913390 | A1 * | 11/2021 | G01S 5/021 |
| WO | WO-2024092224 | A9 * | 5/2025 | G01S 1/24 |

OTHER PUBLICATIONS

Machine translation downloaded from IP.com of EP3913390 translated Dec. 24, 2025 (Year: 2025).*
Zhu et al, "AirSync: Time Synchronization for Large-scale IoT Networks Using Aircraft Signals", 2020 17th Annual IEEE International Conference on Sensing, Communication, and Networking (SECON), Como, Italy, Jun. 22-25, 2020, pp. 1 through 9.
Canals et al., "Robust Indoor Localization with ADS-B", MobiCom '21: Proceedings of the 27th Annual International Conference on Mobile Computing and Networking Oct. 2021, pp. 505 through 516, https://doi.org/10.1145/3447993.3483257.
European Patent Office, "Extended European Search Report", dated Nov. 28, 2025, from EP Application No. 25187405.3, from Foreign Counterpart to U.S. Appl. No. 18/776,581, pp. 1 through 10, Published: EP.
Naganawa et al., "Experimental Evaluation on TDOA-base Aircraft Position Verification", 2020 14th European Conference on Antennas and Propagation (EUCAP). EURAAP, Mar. 15, 2020, pp. 1 through 5.

* cited by examiner

600

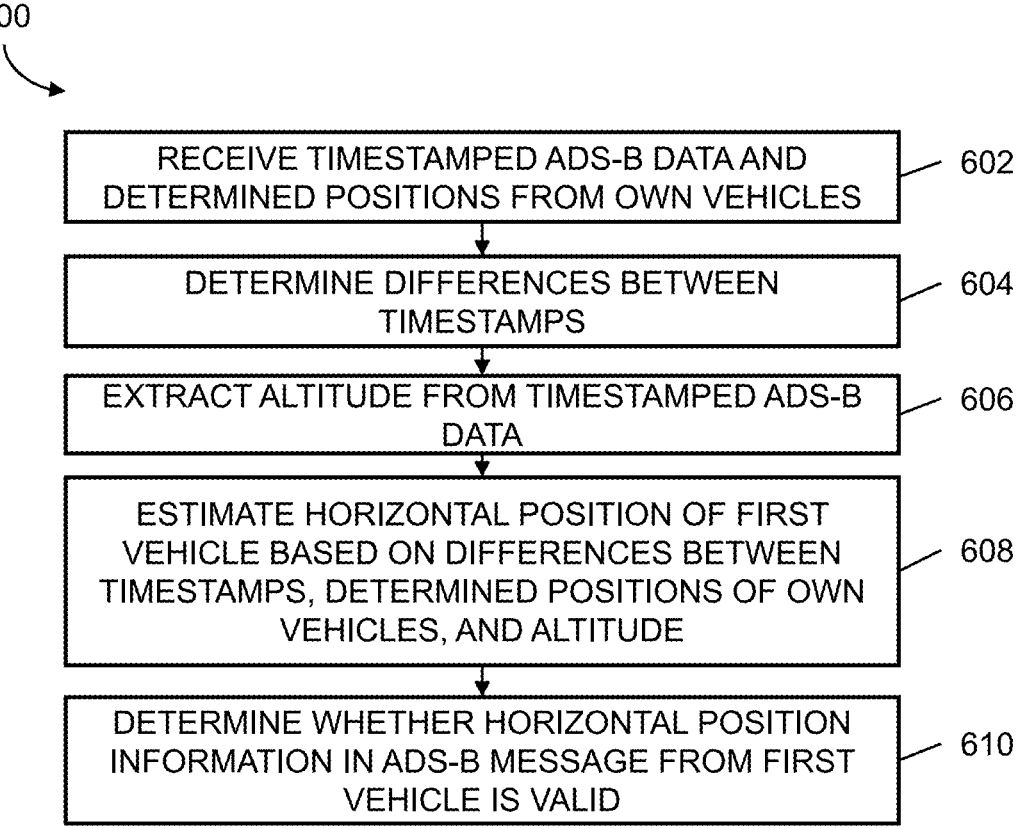

RECEIVE TIMESTAMPED ADS-B DATA AND DETERMINED POSITIONS FROM OWN VEHICLES — 602

DETERMINE DIFFERENCES BETWEEN TIMESTAMPS — 604

EXTRACT ALTITUDE FROM TIMESTAMPED ADS-B DATA — 606

ESTIMATE HORIZONTAL POSITION OF FIRST VEHICLE BASED ON DIFFERENCES BETWEEN TIMESTAMPS, DETERMINED POSITIONS OF OWN VEHICLES, AND ALTITUDE — 608

DETERMINE WHETHER HORIZONTAL POSITION INFORMATION IN ADS-B MESSAGE FROM FIRST VEHICLE IS VALID — 610

FIG. 6

SYSTEMS AND METHODS FOR ADS-B VALIDATION USING VEHICLES

BACKGROUND

Automatic Dependent Surveillance-Broadcast (ADS-B) is a widely used surveillance technology that involves vehicles periodically broadcasting information to ground stations and other vehicles. The broadcasts by the vehicles are known as ADS-B Out messages and the transmission can include identification, position, altitude, velocity, and other flight parameters derived from onboard navigation systems. These broadcasts occur at regular intervals, allowing for real-time tracking and improved situational awareness.

Many vehicles are now equipped with ADS-B In receivers, which can receive ADS-B Out messages from surrounding vehicles. The ADS-B In receivers enable pilots to see nearby vehicles equipped with ADS-B Out via a display, which can provide valuable information for collision avoidance and enhanced awareness of traffic in the vicinity. The combination of ADS-B Out messages and ADS-B In receivers forms a crucial part of modern airspace surveillance and safety systems, contributing to the overall efficiency and security of air travel.

A main weakness of using ADS-B is that ADS-B Out messages are unauthenticated and typically not validated from an outside source either prior to transmission or after reception. Without validation, there is a risk of receiving and acting on unintentionally erroneous information (for example, due to errors in the onboard navigation systems) or intentionally false or misleading information (for example, due to spoofing by a malicious actor). If the erroneous or intentionally false or misleading information is acted upon, it could lead to confusion, collisions, near misses, and other hazardous conditions for surrounding vehicles.

For the reasons above, and for other reasons provided below, there is a need for improved techniques for validating ADS-B messages.

SUMMARY

In some aspects, a system is described herein. The system includes multiple vehicles that are time synchronized. Each respective vehicle of the multiple vehicles is configured to: receive an Automatic Dependent Surveillance-Broadcast (ADS-B) message from a first vehicle; generate respective timestamped ADS-B data from the ADS-B message received from the first vehicle, wherein the respective timestamped ADS-B data includes a timestamp that indicates a time of reception of the ADS-B message at the respective vehicle, an identifier of the first vehicle, horizontal position information, and altitude information; determine a position of the respective vehicle at the time of reception of the ADS-B message at the respective vehicle; and transmit the timestamped ADS-B data and the determined position of the respective vehicle via a datalink connection to a second vehicle or a ground station. The second vehicle or the ground station is configured to: receive, from each of the multiple vehicles, the timestamped ADS-B data and the determined position of the respective vehicle; determine differences in the timestamps for the timestamped ADS-B data from the multiple vehicles; extract the altitude information from the timestamped ADS-B data; determine an estimated horizontal position of the first vehicle based on the differences in timestamps for the timestamped ADS-B data from the multiple vehicles, the determined positions for the multiple vehicles, and the extracted altitude information; and determine whether the horizontal position information in the ADS-B message from the first vehicle is valid based on a comparison of the estimated horizontal position of the first vehicle and the horizontal position information of the first vehicle in the ADS-B message.

In some aspects, a method of validating Automatic Dependent Surveillance-Broadcast (ADS-B) is described herein. The method receiving, from multiple vehicles that are time synchronized, ADS-B data with a timestamp, wherein the ADS-B data includes an identifier of a first vehicle that sent an ADS-B message, horizontal position information in the ADS-B message, and altitude information in the ADS-B message, wherein the timestamp defines a time of reception of the ADS-B message from the first vehicle by the respective vehicle. The method further includes receiving, from each of the multiple vehicles, a determined position of the respective vehicle at the time of reception of the ADS-B message from the first vehicle. The method further includes determining differences in time of arrival for the ADS-B message from the first vehicle to each of the multiple vehicles. The method further includes extracting the altitude information from the ADS-B data. The method further includes determining an estimated horizontal position of the first vehicle based on the differences in time of arrival, the determined positions received from each of the multiple vehicles, and the extracted altitude information. The method further includes determining whether the horizontal position information in the ADS-B message from the first vehicle is valid based on a comparison of the estimated horizontal position of the first vehicle and the horizontal position information in the ADS-B message from the first vehicle.

In some aspects, a ground station is described herein. The ground station includes one or more receivers configured to receive respective timestamped ADS-B data and respective position information from multiple vehicles, wherein the respective timestamped ADS-B data from each respective vehicle includes a respective timestamp indicating a time when the respective vehicle received an ADS-B message from a first vehicle, wherein the respective position information from each respective vehicle includes a position of the respective vehicle at the time when the respective vehicle received the ADS-B message from the first vehicle. The ground station further includes one or more processors communicatively coupled to the one or more receivers and a memory. The one or more processors are configured to: determine differences in the respective timestamps for the respective timestamped ADS-B data from the multiple vehicles; extract altitude information from the timestamped ADS-B data; determine an estimated horizontal position of the first vehicle based on the differences in the respective timestamps for the respective timestamped ADS-B data from the multiple vehicles, the respective positions for the multiple vehicles, and the extracted altitude information; and determine whether horizontal position information in the timestamped ADS-B data is valid based on a comparison of the estimated horizontal position of the first vehicle and the horizontal position information in the timestamped ADS-B data.

BRIEF DESCRIPTION OF THE DRAWINGS

Embodiments of the present invention can be more easily understood and further advantages and uses thereof more readily apparent, when considered in view of the description and the following figures in which:

FIG. 6 illustrates a flow diagram of an example method of ADS-B validation using vehicles.

In accordance with common practice, the various described features are not drawn to scale but are drawn to emphasize features relevant to the present invention. Reference characters denote like elements throughout figures and text.

DETAILED DESCRIPTION

Figure 1:
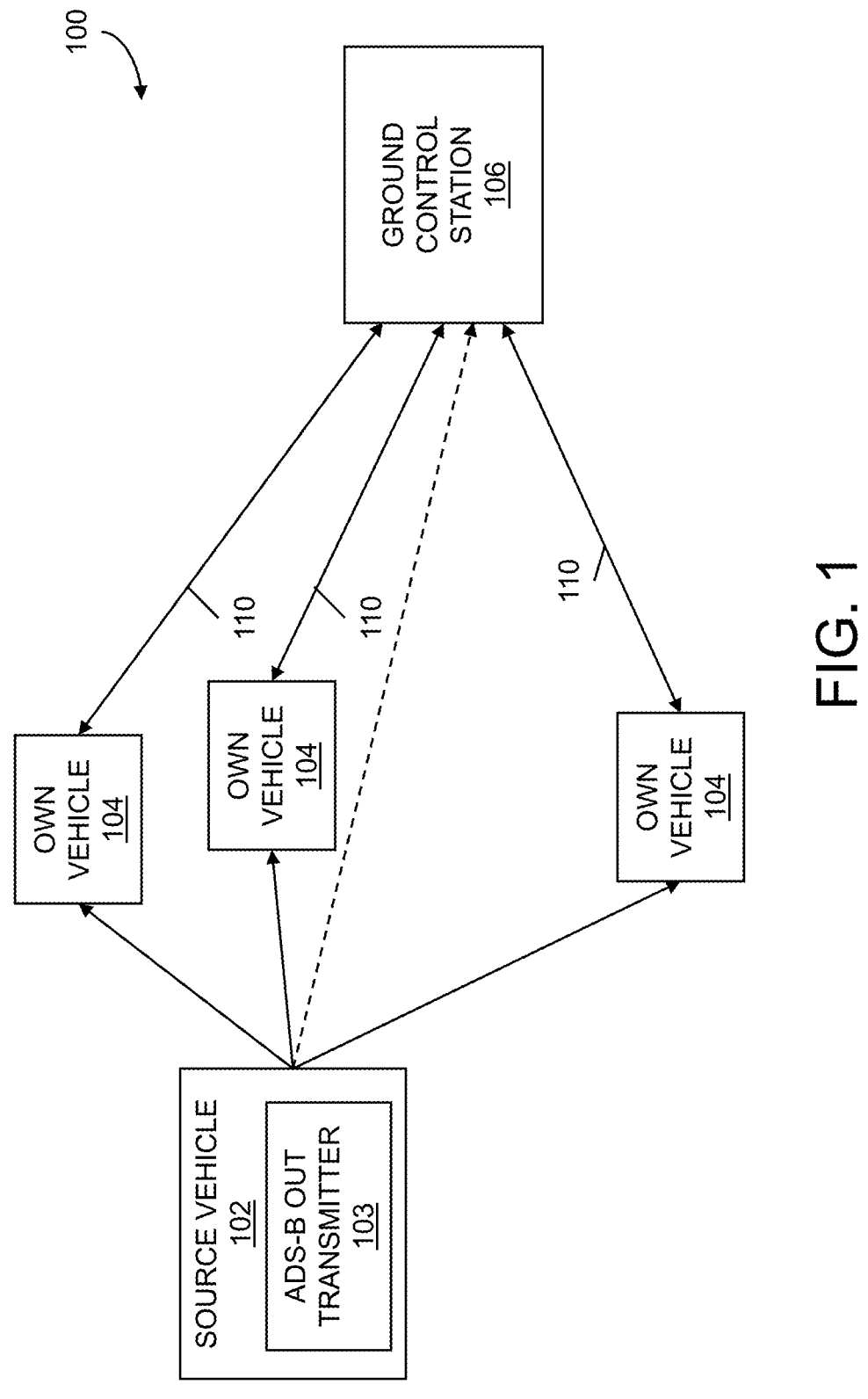
FIG. 1 is a block diagram of an example system.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Some current techniques discuss validating position information provided in ADS-B messages using active interrogation techniques. These techniques are not possible for vehicles that do not include the required transponders. Further, in some situations, the use of active interrogation techniques is prohibited or avoided in order to prevent interference or detection of the vehicle.

Other current techniques have suggested validating horizontal position information and altitude provided in ADS-B messages, but such techniques may provide misleading validations that could lead to confidence in the position information in the ADS-B messages that is not warranted and potentially dangerous. For example, some current techniques purport to validate both the horizontal position information and the altitude information in the ADS-B messages, but the validation of the altitude information is generally not reliable using these techniques when the altitude component is significantly smaller than the horizontal position components. By indicating that the altitude information of the ADS-B messages has been validated, systems may rely on and use this information for navigation, collision avoidance, etc., which could lead to collisions or near-miss scenarios.

The systems and methods described herein validate horizontal position information in ADS-B messages using time-stamped messages received from multiple own vehicles. The multiple own vehicles each receive ADS-B messages from a source vehicle and time stamp the received ADS-B messages to indicate the time that the ADS-B messages are received. Each of the multiple own vehicles provides respective timestamped ADS-B data and a respective position at the time of reception to another vehicle or a ground station for centralized processing. The vehicle or ground station extracts altitude information from the timestamped ADS-B data and determines an estimated horizontal position of the source vehicle based on the differences in timestamps for the timestamped ADS-B data from the multiple own vehicles, the determined positions for the multiple own vehicles, and the extracted altitude information of the source vehicle. The vehicle or ground station also determines whether the horizontal position information in the ADS-B message from the source vehicle is valid based on a comparison of the estimated horizontal position of the first vehicle and the horizontal position information of the source vehicle in the ADS-B message.

In some examples, the validation information about the position information in the ADS-B message from the source vehicle and/or an indication of the trustworthiness of the source vehicle is provided to the multiple own vehicles. In other examples, the validation information about the position information in the ADS-B message from the source vehicle and/or an indication of the trustworthiness of the source vehicle is provided to one or more third parties separate from the own vehicles via a subscription service (for example, via a cloud network).

FIG. 1 illustrates a block diagram of an example system 100 in which the techniques for ADS-B validation discussed herein can be implemented. In the example shown in FIG. 1, the system 100 includes a source vehicle 102, multiple own vehicles 104, and a ground station 106. The components of the system 100 are configured to validate ADS-B messages from the source vehicle 102 using only the features of the own vehicles 104 and the ground station 106. While a particular number of source vehicles 102, own vehicles 104, and ground stations 106 are shown in FIG. 1, it should be understood that this is merely one example and that a different number of own vehicles 104 (two or more) and ground stations 106 (one or more) could be utilized for the techniques described herein.

In some examples, the source vehicle 102 and the own vehicles 104 may be aircraft, and an aircraft is referenced to explain some of the principles described throughout the disclosure. However, the term vehicle is intended to include all such vehicles falling within the ordinary meaning of the term as understood by one having ordinary skill in the art, which includes, but is not limited to, aerial traversing vehicles (for example, commercial, non-commercial, or recreational aircraft), unmanned vehicles (for example, drones, urban air mobility vehicles), ground traversing vehicles (for example, automobiles, trucks, motorcycles), and sea traversing vehicles (for example, commercial or recreational boats/ships).

In the context of FIG. 1, the term "source vehicle" refers to a vehicle that is the source of the ADS-B messages that are to be validated using the techniques described herein. The source vehicle 102 is typically not associated with or under the control of the ground station 106. In the context of claim 1, the term "own vehicles" refers to vehicles that receive the ADS-B messages from the source vehicle 102. The own vehicles 104 are associated with each other and the ground station 106 and/or under the control of the ground station 106.

In the example shown in FIG. 1, the source vehicle 102 is configured to transmit ADS-B messages via an ADS-B Out transmitter 103. In some examples, the ADS-B messages transmitted by the ADS-B Out transmitter 103 of the source vehicle 102 include an identifier, horizontal position information, altitude information, velocity information, and/or other flight parameters for the source vehicle 102. The ADS-B Out transmitter 103 of the source vehicle 102 generally transmits the ADS-B messages at regular intervals, and the particular intervals depend on the type of information provided in the ADS-B messages and the status of the source vehicle 102. For ADS-B messages, the horizontal position information typically includes latitude and longitude information. However, it should be understood that horizontal position information in the ADS-B messages can be provided in different coordinate system, if allowable.

Figure 2:
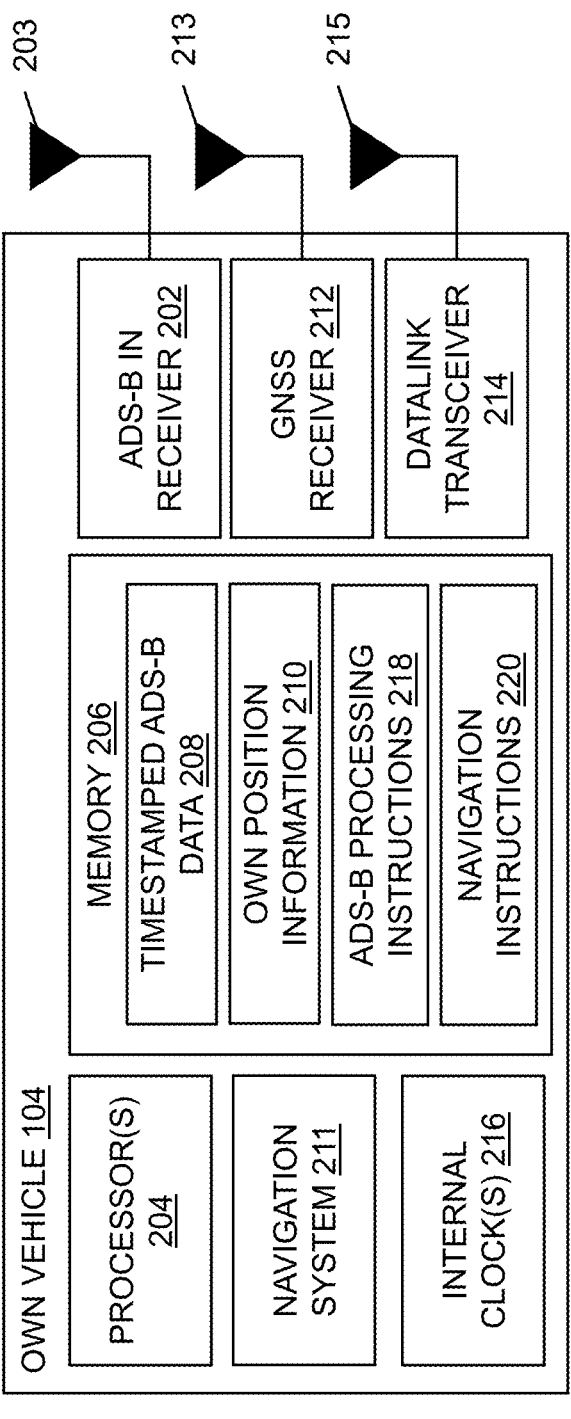
FIG. 2 is a block diagram of an example vehicle.

In the example shown in FIG. 1, each own vehicle 104 is configured to receive and process ADS-B messages from the source vehicle 102 during operation. FIG. 2 is a block diagram of an example own vehicle 104. In the example shown in FIG. 2, the own vehicle 104 includes an ADS-B In receiver 202 coupled to an antenna 203, one or more processors 204 communicatively coupled to the ADS-B In receiver 202 and a memory 206, a navigation system 211, a Global Navigation Satellite System (GNSS) receiver 212 coupled to an antenna 213, a datalink transceiver 214 coupled to an antenna 215, and one or more internal clocks 216. While a particular number of components are shown in FIG. 2, it should be understood that this is merely one example and that a different number of receivers, antennas, memories, or other components could also be included in the own vehicle 104. Further, while the components of the own vehicles 104 are shown as being separate, it should be understood that at least some of the components can be integrated into a single device (for example, a flight control computer that includes GNSS and ADS-B processing capabilities).

Each own vehicle 104 is configured to receive the ADS-B messages from the source vehicle 102 via the antenna 203 and process the ADS-B messages using the ADS-B In receiver 202. In some examples, the ADS-B In receiver 202 is configured to demodulate and decode the ADS-B messages received from the source vehicle 102 at the antenna 203 in order to extract the information provided by the source vehicle 102 in the ADS-B messages. In some examples, the demodulated and decoded data from the ADS-B messages from the source vehicle 102 is saved in the memory 206 of the own vehicle 104.

Each own vehicle 104 includes one or more internal clocks 216 that are time synchronized to the internal clocks 216 of other own vehicles 104. In general, the more precise the time that is used to discipline the one or more internal clocks 216 of the own vehicles 104, the better the time synchronization between the one or more internal clocks 216 of the different own vehicles 104 will be and thus the better the estimation of the horizontal position of the source vehicle 102.

In some examples, it is desirable to synchronize the one or more internal clocks 216 of the own vehicles 104 on the order of hundreds of nanoseconds in order to provide better performance of the estimation of the horizontal position of the source vehicle 102. Typically, synchronization techniques over the Network Time Protocol (NTP) may not be sufficient to provide the desired level of performance. However, synchronization of the one or more internal clocks 216 based on GNSS signals can offer sufficient synchronization performance to reach the desired performance. In some situations, synchronization of the one or more internal clocks 216 based on signals from a cellular network can also offer sufficient synchronization performance to reach the desired performance.

In some examples, the own vehicles 104 further include a GNSS receiver 212 that is configured to receive GNSS signals from satellites of one or more GNSS constellations (such as Global Positioning System (GPS), GLONASS, Galileo, BeiDou, etc.) via the antenna 213. In some examples, the GNSS receiver 212 is configured to utilize GNSS signals from satellites of a single GNSS constellation. In other examples, the GNSS receiver 212 is configured to utilize GNSS signals from satellites of multiple GNSS constellations. In some examples where the own vehicles 104 include a GNSS receiver 212, the one or more internal clocks 216 of the own vehicles 104 are time synchronized by disciplining the one or more internal clocks 216 using GNSS signals that are received by the GNSS receiver 212. In some such examples, the one or more internal clocks 216 of the own vehicles 104 are GNSS disciplined oscillators.

In other examples, the one or more internal clocks 216 are disciplined using a cellular network or communication network. In such examples, the own vehicles 104 would include a cellular receiver (not shown) and an antenna configured to receive cellular signals from nearby base stations, and the own vehicles 104 discipline the one or more internal clocks 216 using cellular signals (for example, LTE signals or 5G signals) from nearby base stations. In some such examples, the GNSS receiver 212 and the antenna 213 are omitted and replaced with the cellular receiver and antenna. However, in other examples, the own vehicles 104 include both the GNSS receiver 212 and the cellular receiver in addition to the respective antennas.

In the example shown in FIG. 2, the memory 206 of the own vehicle 104 includes ADS-B processing instructions 218. When executing the ADS-B processing instructions 218, the one or more processors 204 are configured to timestamp, using the one or more internal clocks 216, the ADS-B messages or the data in the ADS-B messages received from the source vehicle 102 in order to indicate the time the ADS-B messages were received by the respective own vehicle 104. In some examples, the own vehicles 104 are configured to timestamp the ADS-B data to indicate the time of reception of the ADS-B message, and the time-stamped ADS-B data 208 is stored in the memory 206 of the own vehicles 104. In some examples, the timestamped ADS-B data 208 includes the identifier, horizontal position information, and altitude information of the source vehicle 102 in addition to the timestamp indicating when the ADS-B message from the source vehicle 102 that included the identifier, horizontal position information, and altitude information of the source vehicle 102 was received by the own vehicle 104.

Each of the own vehicles 104 is also configured to determine its own position at the time the ADS-B message is received from the source vehicle 102. The own position information 210 is also stored in the memory 206 of the own vehicles 104. In some examples, the own position information 210 is stored in a database with the timestamped ADS-B data 208 and the own position information 210 is correlated with the timestamped ADS-B data 208 for a particular ADS-B message. The structure of the database can be organized in various ways. In some examples, the timestamp, identifier of the source vehicle 102, horizontal position information of the source vehicle 102, altitude information of the source vehicle 102, and own position information of the own vehicle 104 corresponding to the timestamp are all correlated in the database.

In some examples, the own vehicle 104 is configured to determine its position based on GNSS signals alone received by the GNSS receiver 212 via the antenna 213. In some examples, the own vehicles 104 also include a navigation system 211 configured to determine the position of the own vehicles 104 at a given time. In other examples, the own vehicle 104 is configured to determine its position based on GNSS signals combined with signals from a navigation system 211 (for example, an inertial navigation system). In other examples, the own vehicle 104 is configured to determine its position using only the navigation system 211 and without using GNSS signals.

In some examples, such as when the frequency of the position determination by the own vehicles 104 is low, extrapolation/interpolation can be used to determine the position of the own vehicle 104 at the time that a particular ADS-B message is received by the own vehicle 104. However, typical navigation systems will most likely not need to use extrapolation/interpolation since the frequency of position determination will likely be sufficient to have a position determined at the same time that the ADS-B message is received by the own vehicles 104 from the source vehicle 102. It should be understood that other techniques for determining the own position information 210 of the own vehicles 104 can also be used based on the capabilities of the own vehicles 104. In general, the more accurate the position determination by the own vehicles 104, the better the validation can be of the position information from the ADS-B messages from the source vehicle 102.

In some examples, each of the own vehicles 104 is configured to transmit the timestamped ADS-B data 208 and the own position information 210 to the ground station 106 over a communication link 110. In some examples, the communication link 110 is a wireless communication link. In other examples, the communication link 110 is a wired communication link (for example, when the own vehicles 104 are tethered drones).

In the example shown in FIG. 2, the own vehicle 104 includes a datalink transceiver 214 and an antenna 215 configured to wirelessly transmit the timestamped ADS-B data 208 and the own position information 210 to the ground station 106. In some examples, the communication link 110 is implemented using frequency band(s) and protocols for SATCOM. In some examples, the communication link 110 is implemented using frequency band(s) and protocols for a cellular communication network. In other examples, the communication link 110 is implemented using a dedicated datalink between the own vehicles 104 and the ground station 106 that utilizes frequency band(s) and protocols other than for SATCOM or cellular communication networks. While a single datalink transceiver 214 is shown in FIG. 2, it should be understood that the own vehicle 104 can include multiple datalink transceivers 214 and utilize multiple datalinks and communications technologies at once to communicate with the ground station 106 and/or other own vehicles 104.

In some examples, the own vehicles 104 transmit the timestamped ADS-B data 208 and the own position information 210 to the ground station 106 at periodic intervals. In other examples, the own vehicles 104 transmit the timestamped ADS-B data 208 and the own position information 210 to the ground station 106 after storing the timestamped ADS-B data 208 and the own position information 210 corresponding to a newly received ADS-B message. In other examples, the own vehicles 104 transmit the timestamped ADS-B data 208 and the own position information 210 to the ground station 106 upon request from the ground station 106. In some examples, the own vehicles 104 utilize the same techniques (for example, type of datalinks, communications technologies, and timing of transmissions) for transmission of the timestamped ADS-B data 208 and the own position information 210 to the ground station 106. In other examples, the own vehicles 104 utilize different techniques for transmission of the timestamped ADS-B data 208 and the own position information 210 to the ground station 106. For example, at least one of the own vehicles 104 utilizes a different type of datalink, communications technology, and/ or timing of transmission than at least one other own vehicle 104.

In the example shown in FIG. 2, the memory 206 of the own vehicle 104 also includes navigation instructions 220. When executing the navigation instructions 220, the one or more processors 204 are configured to process control signals received from the ground station 106. In some examples, the control signals provide navigation guidance to the own vehicle 104 while the own vehicle is on the ground or in flight during a mission.

Figure 3:
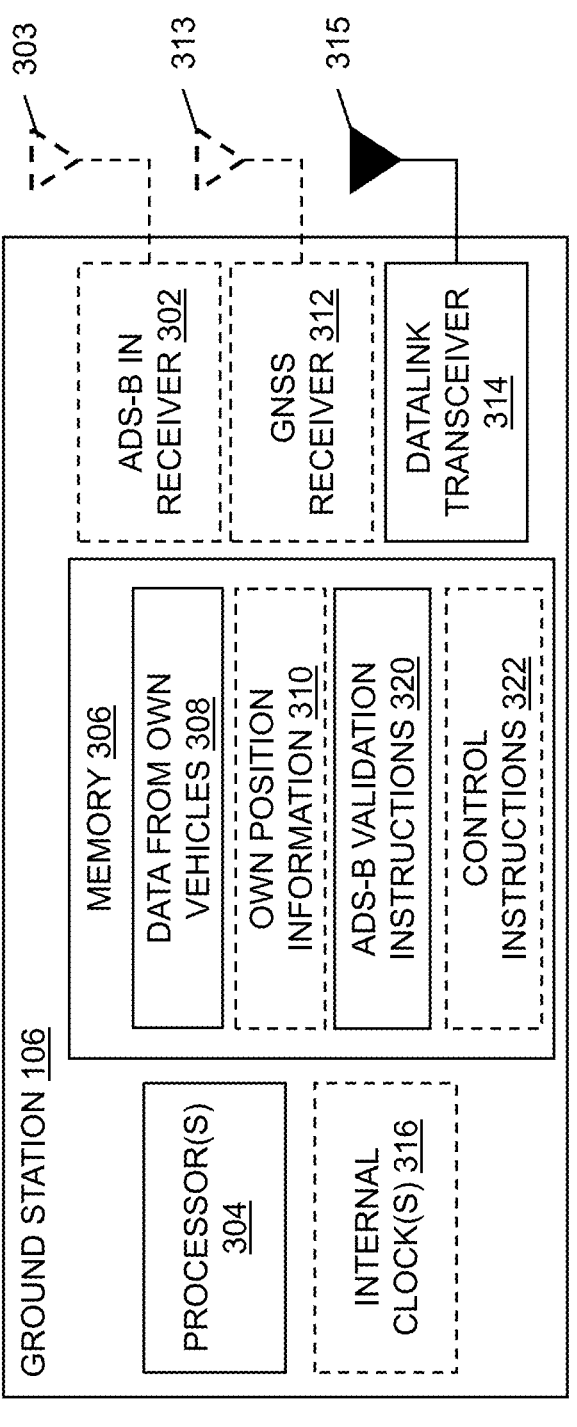
FIG. 3 is a block diagram of an example ground station.

FIG. 3 is a block diagram of an example ground station 106. In the example shown in FIG. 3, the ground station 106 includes an antenna 315, a datalink transceiver 314, and one or more processors 304 communicatively coupled to the datalink transceiver 314 and a memory 306. While a particular number of components are shown in FIG. 3, it should be understood that this is merely one example and that a different number of receivers, antennas, memories, or other components could also be included in the ground station 106.

The ground station 106 is configured to receive timestamped ADS-B data 208 and the own position information 210 from the own vehicles 104 via the datalink transceiver 314 and the antenna 315. The ground station 106 is configured to store the data from the own vehicles 308 in the memory 306. The data from the own vehicles 308 stored in memory 306 includes the timestamped ADS-B data 208 and the own position information 210 from each of the own vehicles 104 that is received by the ground station 106.

In some examples, the ground station 106 optionally includes an ADS-B In receiver 302 and an antenna 303. In such examples, the ground station 106 is configured to receive the ADS-B messages from the source vehicle 102 via the antenna 303 and process the ADS-B messages using the ADS-B In receiver 302. In some examples, the ADS-B In receiver 302 is configured to demodulate and decode the ADS-B messages received from the source vehicle 102 at the antenna 303 in order to extract the information provided by the source vehicle 102 in the ADS-B messages. In some examples, the demodulated and decoded data from the ADS-B messages from the source vehicle 102 is saved in the memory 306 of the ground station 106.

In some examples, the ground station 106 includes optionally one or more internal clocks 316 that are time synchronized to the internal clocks 216 of the own vehicles 104. In examples where the one or more internal clocks 316 are time synchronized to the one or more internal clocks 216 of the own vehicles 104 based on GNSS signals, the ground station 106 also includes a GNSS receiver 312 and an antenna 313 configured to receive and process GNSS signals. In examples where the one or more internal clocks 316 are time synchronized to the one or more internal clocks 216 of the own vehicles 104 based on cellular communication signals, the ground station 106 also includes a cellular receiver and an antenna configured to receive and process cellular communication signals.

In the examples where the ground station 106 is configured to receive ADS-B messages from the source vehicle 102 and includes one or more internal clocks 316 that are time synchronized to the one or more internal clocks 216 of the own vehicles 104, the ground station 106 is configured to timestamp the ADS-B data from the ADS-B messages from the source vehicle 102 received by the ground station 106 and save the timestamped ADS-B data in the memory 306 in addition to the data from the own vehicles 308. Similar to the own vehicles 104, the ground station 106 includes a timestamp that indicates the time that the ground station 106 received the ADS-B message from the source vehicle 102.

In some examples, the ground station 106 is also configured to save its own position information 310 in the memory 306. Since the ground station 106 is stationary, the own position information 310 of the ground station 106 can include a known (for example, surveyed) position that is determined at a time different from the time of reception of the ADS-B message from the source vehicle 102. The ground station 106 can also determine its own position based using GNSS signals and/or a navigation system similar to the own vehicles 104 if desired, but this will typically not be necessary.

In the example shown in FIG. 3, the ground station 106 includes ADS-B validation instructions 320 stored in the memory 306. When executing the ADS-B validation instructions 320, the one or more processors 304 are configured to extract altitude information from ADS-B message from the source vehicle 102 that is included in the data from the own vehicles 308. The altitude information includes an alleged altitude of the source vehicle 102 when the source vehicle 102 sent the ADS-B message.

In the techniques described herein, the ground station 106 does not validate the altitude information that is included in the ADS-B message from the source vehicle 102. Typically, the horizontal position information and the altitude information that are provided in an ADS-B message are obtained by different sensors of the source vehicle 102. For example, the horizontal position information is provided by GNSS, and the altitude information is provided by a barometric sensor. For the techniques described herein, the ground station 106 is configured to trust the altitude information that is included in the ADS-B message from the source vehicle 102 and use the altitude information when validating the horizontal position information includes in the ADS-B message from the source vehicle 102.

When executing the ADS-B validation instructions 320, the one or more processors 304 are configured to determine differences between the timestamps for the timestamped ADS-B data 208 from the different own vehicles 104 for the same ADS-B message. The differences between the timestamps for the timestamped ADS-B data 208 from the different own vehicles 104 represent the time difference of arrival for the ADS-B message at the different own vehicles 104.

When executing the ADS-B validation instructions 320, the one or more processors 304 are configured to estimate a horizontal position of the source vehicle 102 at the time the ADS-B message was transmitted based on the differences between the timestamps of the timestamped ADS-B data 208 (and the timestamped ADS-B data of the ground station 106 where applicable), the own position information 210 from the own vehicles 104 (and the own position information 310 of the ground station 106 where applicable), and the extracted altitude information. In some examples, the ADS-B validation instructions 320 utilize triangulation techniques to estimate the horizontal position of the source vehicle 102. In such examples, the set of equations for each of the own vehicles 104 can be solved using a linear iterative least squares method. Other suitable techniques for estimating the horizontal position of the source vehicle 102 can also be used.

In some examples, when executing the ADS-B validation instructions 320, the one or more processors 304 determine a difference between the estimated position of the source vehicle 102 and the horizontal position information that was included in the ADS-B message from the source vehicle 102 and determine whether the difference exceeds a threshold. In some examples, the threshold is adaptable and can depend on a variety of different information.

In some examples, the threshold is determined using integrity information and/or accuracy information that is included in the ADS-B message from the source vehicle 102. It is common for an ADS-B message to include quality parameters that include information about how accurate the horizontal position information and altitude information is and integrity information that indicates how reliable the horizontal position information and altitude information is in the ADS-B message. In some examples, the integrity information includes a container that defines a range that the horizontal position should be within, and this container is represented with numeric values.

In some examples, the threshold is determined based on the particular application and desired use of the information contained in the ADS-B message from the source vehicle 102. If the information in the ADS-B message is to be used for collision avoidance or navigation purposes, then the threshold will be reduced since the consequences of using faulty or spoofed information can be higher. However, if the information in the ADS-B message is to be used as rough information, then the threshold can be greater as the consequences of using faulty or spoofed information is not as high.

If the difference between the estimated position of the source vehicle 102 and the horizontal position information in the ADS-B message from the source vehicle 102 exceeds the threshold, then the ADS-B message and/or information contained therein from the source vehicle 102 can be marked, flagged, or otherwise indicated to be faulty or spoofed. Depending on the circumstances, it may not be apparent as to whether the altitude information or the horizontal position information in the ADS-B message or both was faulty. In some examples, additional processing is performed in order to attempt to determine whether the altitude information or the horizontal position information or both was faulty.

In contrast, if the difference between the estimated position of the source vehicle 102 and the horizontal position information in the ADS-B message from the source vehicle 102 does not exceed the threshold, then the ADS-B message and/or information contained therein from the source vehicle 102 can be marked, flagged, or otherwise indicated to be validated.

In some examples, the ground station 106 is configured to provide an indication of whether an ADS-B message and/or the information contained therein is valid to the own vehicles 104 in response to the determination. In some examples, the ground station 106 is configured to provide the indication to the own vehicles 104 via the communication link 110. In such examples, the own vehicles 104 can utilize the indication from the ground station 106 in detect and avoid systems or collision avoidance systems onboard the own vehicles 104. For example, the own vehicles 104 can utilize the horizontal position information from the ADS-B message from the source vehicle 102 if the ground station 106 provides an indication that the horizontal position information and/or the ADS-B message from the source vehicle 102 is valid.

In some examples, the memory 306 of the ground station 106 further includes control instructions 322. When executing the control instructions 322, the one or more processors 304 are configured to provide control signals with navigation guidance to the own vehicles 104. In some examples, when executing the control instructions 322, the one or more processors 304 are configured to provide navigation guidance to the own vehicles 104 while the own vehicles 104 are on the ground or in flight during a mission. In some examples, when executing the control instructions 322, the one or more processors 304 are configured to utilize the validation information about the horizontal position information included in the ADS-B message from the source vehicle 102 in detect and avoid systems or collision avoidance systems implemented by the ground station 106. In such examples, the ground station 106 provides control signals to the own vehicles 104 that are based on the output of the detect and avoid systems or collision avoidance systems implemented by the ground station 106.

In some examples, the ground station 106 can also provide an indication of trustworthiness of the source vehicle 102 to the own vehicles 104. In such examples, the ground station 106 is configured to determine the indication of trustworthiness based on multiple determinations about the validity of horizontal position information in ADS-B messages from the source vehicle 102. If it is determined that the horizontal position information from multiple ADS-B messages from the source vehicle 102 is not valid, then the ground station 106 is configured to provide an indication that the source vehicle 102 is not trustworthy and information from the source vehicle 102 should not be used by the own vehicles 104 for navigation. The evaluation of trustworthiness can be on-going such that the trustworthiness of the source vehicle 102 is determined over a period of time and reevaluated.

In some examples, in addition to or instead of providing the validation information and/or trustworthiness information to the own vehicles 104, the ground station 106 is configured to provide the validation information and/or trustworthiness information about the source vehicle 102 to a third party that is separate and distinct from the own vehicles 104. In some examples, the validation information can be uploaded from the ground station 106 to a server that can be accessed by the third party via an interface. In some examples, the third party can be a subscriber to a traffic information service that relies on validation information provided by the ground station 106. In other examples, the third party can be a government or intelligence entity (for example, that controls the own vehicles 104 and the ground station 106 or its allies). It should be understood that at least one of the own vehicles 104 can also obtain the validation information and/or trustworthiness information via the server in addition to, or instead of, obtaining the validation information and/or trustworthiness information via the communication link 110.

Figure 4:
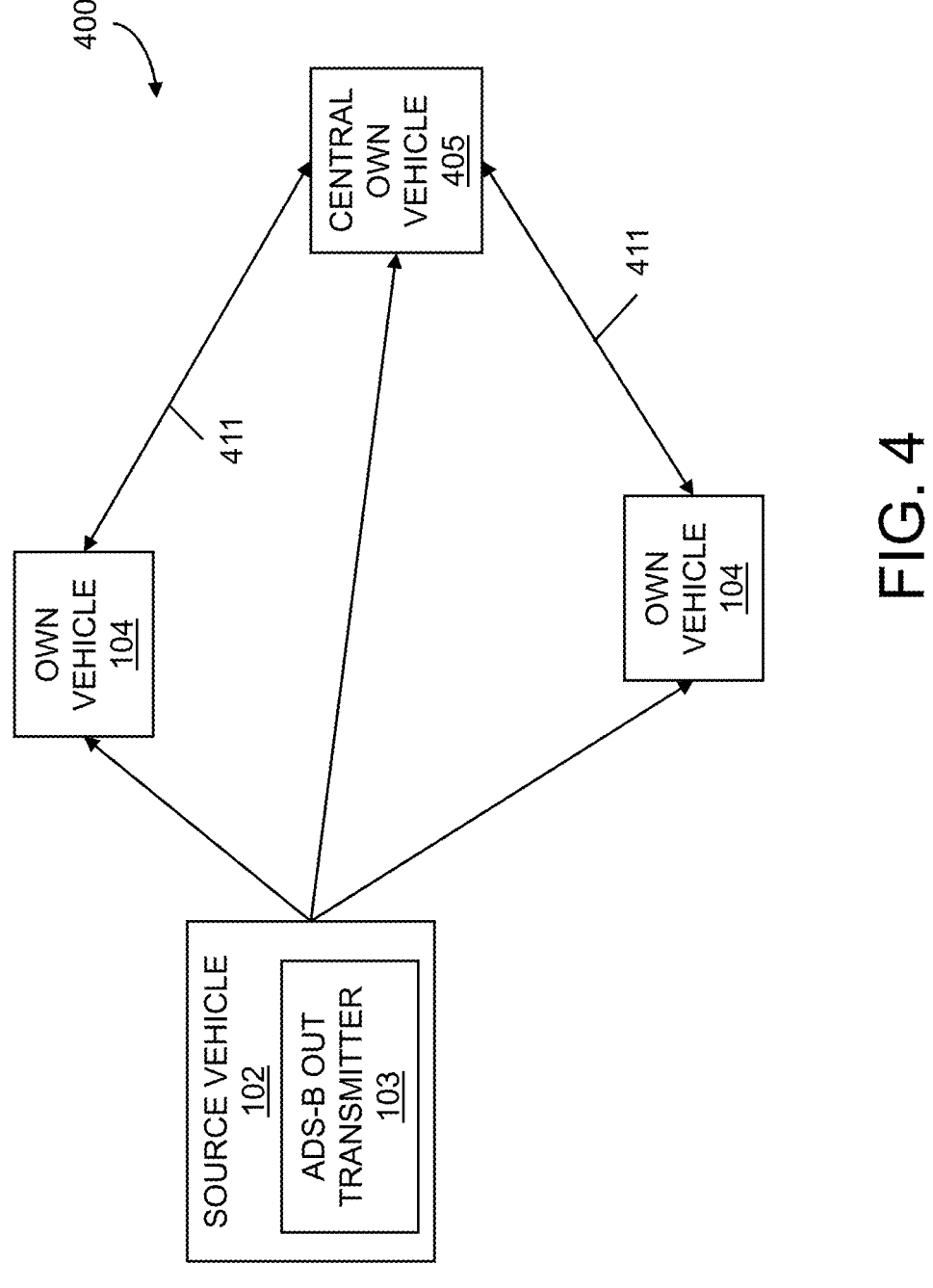
FIG. 4 is a block diagram of another example system.

FIG. 4 is a block diagram of another example system 400 in which the techniques for ADS-B validation discussed herein can be implemented. In the example shown in FIG. 4, the system 400 includes a source vehicle 102, multiple own vehicles 104, and a central own vehicle 405. The components of the system 400 are configured to validate ADS-B messages from the source vehicle 102 using only the features of the own vehicles 104 and the central own vehicle 405. While a particular number of source vehicles 102, own vehicles 104, and central own vehicles 405 are shown in FIG. 4, it should be understood that this is merely one example and that a different number of own vehicles 104 (two or more) and central own vehicles 405 (one or more) could be utilized for the techniques described herein.

In the example shown in FIG. 4, the source vehicle 102 operates in the same manner and the own vehicles 104 operate in a similar manner to that described above with respect to FIG. 1. Only the differences will be discussed with respect to FIG. 4.

Instead of transmitting the timestamped ADS-B data 208 and the own position information 210 to the ground station 106, the own vehicles 104 are configured to wirelessly transmit the timestamped ADS-B data 208 and the own position information 210 to the central own vehicle 405 over a wireless communication link 411. In such examples, the datalink transceiver 214 and the antenna 215 are configured to wirelessly transmit the timestamped ADS-B data 208 and the own position information 210 to the central own vehicle 405. In some examples, the wireless communication link 411 is implemented using frequency band(s) and protocols for SATCOM. In some examples, the wireless communication link 411 is implemented using frequency band(s) and protocols for a cellular communication network. In other examples, the wireless communication link 411 is implemented using a dedicated datalink between the own vehicles 104 and the central own vehicle 405 that utilizes frequency band(s) and protocols other than for SATCOM or cellular communication networks. While a single datalink transceiver 214 is shown in FIG. 2, it should be understood that the own vehicle 104 can include multiple datalink transceivers 214 and utilize multiple datalinks and communications technologies at once to communicate with the central own vehicle and/or other own vehicles 104.

In some examples, the own vehicles 104 transmit the timestamped ADS-B data 208 and the own position information 210 to the central own vehicle 405 at periodic intervals. In other examples, the own vehicles 104 transmit the timestamped ADS-B data 208 and the own position information 210 to the central own vehicle 405 after storing the timestamped ADS-B data 208 and the own position information 210 corresponding to a newly received ADS-B message. In other examples, the own vehicles 104 transmit the timestamped ADS-B data 208 and the own position information 210 to the central own vehicle 405 upon request from the central own vehicle 405. In some examples, the own vehicles 104 utilize the same techniques (for example, type of datalinks, communications technologies, and timing of transmissions) for transmission of the timestamped ADS-B data 208 and the own position information 210 to the central own vehicle 405. In other examples, the own vehicles 104 utilize different techniques for transmission of the timestamped ADS-B data 208 and the own position information 210 to the central own vehicle 405 (assuming those techniques are supported by the central own vehicle 405). For example, at least one of the own vehicles 104 utilizes a different type of datalink, communications technology, and/or timing of transmission than at least one other own vehicle 104.

Figure 5:
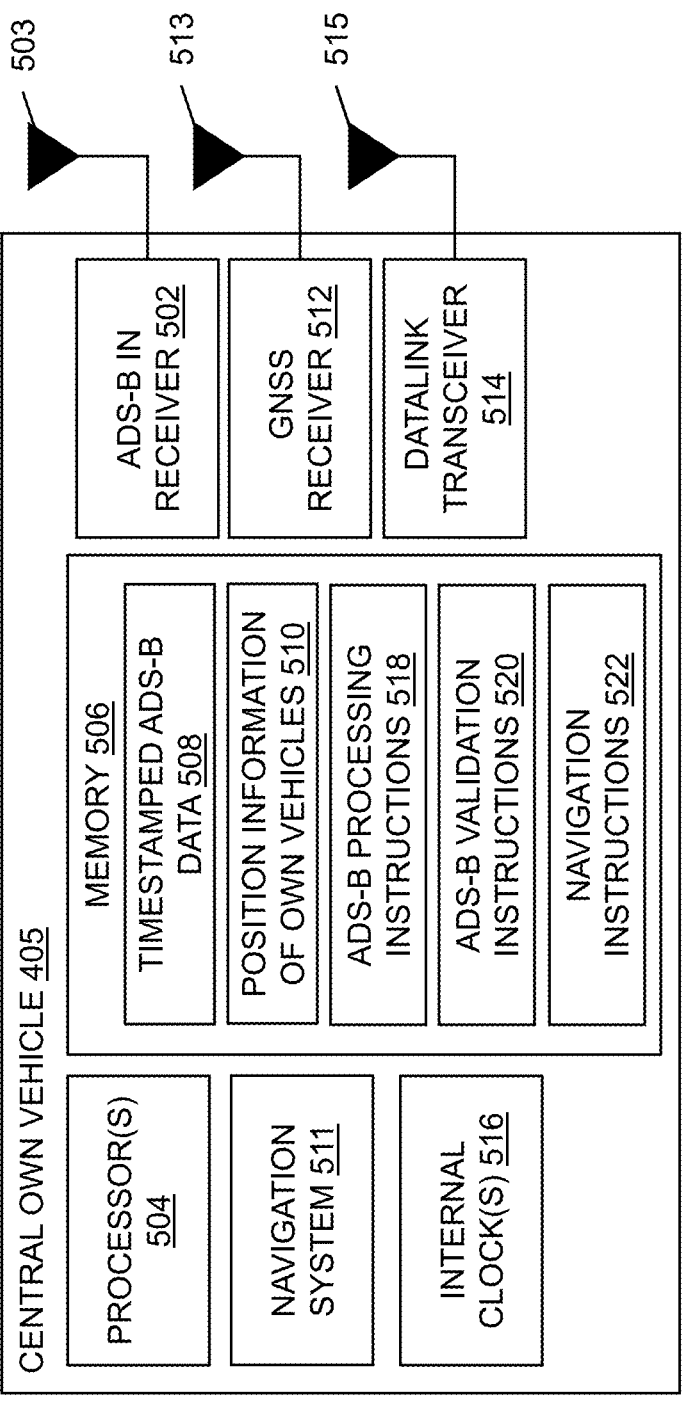
FIG. 5 is a block diagram of another example vehicle.

FIG. 5 is a block diagram of an example central own vehicle 405. In the example shown in FIG. 5, the central own vehicle 405 includes an ADS-B In receiver 502 coupled to an antenna 503, one or more processors 504 communicatively coupled to the ADS-B In receiver 502 and a memory 506, a navigation system 511, a GNSS receiver 512 coupled to an antenna 513, a datalink transceiver 514 coupled to an antenna 515, and one or more internal clocks 516. While a particular number of components are shown in FIG. 5, it should be understood that this is merely one example and that a different number of receivers, antennas, memories, or other components could also be included in the central own vehicle 405.

In the example shown in FIG. 5, the central own vehicle 405 includes one or more internal clocks 516 that are time synchronized to the internal clocks 216 of the own vehicles 104. In examples where the one or more internal clocks 516 are time synchronized to the one or more internal clocks 216 of the own vehicles 104 based on GNSS signals, the central own vehicle 405 also includes a GNSS receiver 512 and an antenna 513 configured to receive and process GNSS signals. In examples where the one or more internal clocks 516 are time synchronized to the one or more internal clocks 216 of the own vehicles 104 based on cellular communication signals, the central own vehicle 405 also includes a cellular receiver and an antenna configured to receive and process cellular communication signals.

In the example shown in FIG. 5, the memory 506 of the central own vehicle 405 includes ADS-B processing instructions 518. When executing the ADS-B processing instructions 518, the one or more processors 504 are configured to timestamp, using the one or more internal clocks 516, the ADS-B messages or the data in the ADS-B messages received from the source vehicle 102 in order to indicate the time the ADS-B messages were received by the central own vehicle 405. In some examples, the central own vehicle 405 is configured to timestamp the ADS-B data to indicate the time of reception of the ADS-B message, and the timestamped ADS-B data is stored in the memory 506 of the central own vehicle 405. In some examples, the timestamped ADS-B data includes the identifier, horizontal position information, and altitude information of the source vehicle 102 in addition to the timestamp indicating when the ADS-B message from the source vehicle 102 that included the identifier, horizontal position information, and altitude information of the source vehicle 102 was received by the central own vehicle 405.

The central own vehicle 405 is configured to receive timestamped ADS-B data 208 and the own position information 210 from the own vehicles 104 via the datalink transceiver 514 and the antenna 515. The central own vehicle 405 is configured to store timestamped ADS-B data 508, which includes the timestamped ADS-B data 208 from the own vehicles 104 and the timestamped ADS-B data generated by the central own vehicle 405, in the memory 506. The central own vehicle 405 is also configured to store own position information 510, which includes the determined positions of the own vehicles 104 and the determined position of the central own vehicle 405, in the memory 506.

In the example shown in FIG. 5, the central own vehicle 405 includes ADS-B validation instructions 520 stored in the memory 506. When executing the ADS-B validation instructions 520, the one or more processors 504 are configured to extract altitude information from ADS-B message from the source vehicle 102 that is included in the timestamped ADS-B data. The altitude information includes an alleged altitude of the source vehicle 102 when the source vehicle 102 sent the ADS-B message.

In the techniques described herein, the central own vehicle 405 does not validate the altitude information that is included in the ADS-B message from the source vehicle 102. Typically, the horizontal position information and the altitude information that are provided in an ADS-B message are obtained by different sensors of the source vehicle 102. For example, the horizontal position information is provided by GNSS, and the altitude information is provided by a barometric sensor. For the techniques described herein, the central own vehicle 405 is configured to trust the altitude information that is included in the ADS-B message from the source vehicle 102 and use the altitude information when validating the horizontal position information includes in the ADS-B message from the source vehicle 102.

When executing the ADS-B validation instructions 520, the one or more processors 504 are configured to determine differences between the timestamps for the timestamped ADS-B data 508 for the same ADS-B message. The differences between the timestamps for the timestamped ADS-B data 508 represent the time difference of arrival for the ADS-B message at the different own vehicles 104 and the central own vehicle 405.

When executing the ADS-B validation instructions 520, the one or more processors 504 are configured to estimate a horizontal position of the source vehicle 102 at the time the ADS-B message was transmitted based on the differences between the timestamps of the timestamped ADS-B data 508, the own position information 510, and the extracted altitude information. In some examples, the ADS-B validation instructions 520 utilize triangulation techniques similar to those described above to estimate the horizontal position of the source vehicle 102. In such examples, the set of equations for each of the own vehicles 104 can be solved using a linear iterative least squares method. Other suitable techniques for estimating the horizontal position of the source vehicle 102 can also be used.

In some examples, when executing the ADS-B validation instructions 520, the one or more processors 504 determine a difference between the estimated position of the source vehicle 102 and the horizontal position information that was included in the ADS-B message from the source vehicle 102 and determine whether the difference exceeds a threshold. In some examples, the threshold is adaptable and can depend on a variety of different information.

In some examples, the threshold is determined using integrity information and/or accuracy information that is included in the ADS-B message from the source vehicle 102. It is common for an ADS-B message to include quality parameters that include information about how accurate the horizontal position information and altitude information is and integrity information that indicates how reliable the horizontal position information and altitude information is in the ADS-B message. In some examples, the integrity information includes a container that defines a range that the horizontal position should be within, and this container is represented with numeric values.

In some examples, the threshold is determined based on the particular application and desired use of the information contained in the ADS-B message from the source vehicle 102. If the information in the ADS-B message is to be used for collision avoidance or navigation purposes, then the threshold will be reduced since the consequences of using faulty or spoofed information can be higher. However, if the information in the ADS-B message is to be used as rough information, then the threshold can be greater as the consequences of using faulty or spoofed information is not as high.

If the difference between the estimated position of the source vehicle 102 and the horizontal position information in the ADS-B message from the source vehicle 102 exceeds the threshold, then the ADS-B message and/or information contained therein from the source vehicle 102 can be marked, flagged, or otherwise indicated to be faulty or spoofed. Depending on the circumstances, it may not be apparent as to whether the altitude information or the horizontal position information in the ADS-B message or both was faulty. In some examples, additional processing is performed in order to attempt to determine whether the altitude information or the horizontal position information or both was faulty.

In contrast, if the difference between the estimated position of the source vehicle 102 and the horizontal position information in the ADS-B message from the source vehicle 102 does not exceed the threshold, then the ADS-B message and/or information contained therein from the source vehicle 102 can be marked, flagged, or otherwise indicated to be validated.

In some examples, the central own vehicle 405 is configured to provide an indication of whether an ADS-B message and/or the information contained therein is valid to the own vehicles 104 in response to the determination. In some examples, the central own vehicle 405 is configured to provide the indication to the own vehicles 104 via the wireless communication link 411. In such examples, the own vehicles 104 can utilize the indication from the central own vehicle 405 in detect and avoid systems or collision avoidance systems onboard the own vehicles 104. For example, the own vehicles 104 can utilize the horizontal position information from the ADS-B message from the source vehicle 102 if the central own vehicle 405 provides an indication that the horizontal position information and/or the ADS-B message from the source vehicle 102 is valid.

In some examples, the central own vehicle 405 can also provide an indication of trustworthiness of the source vehicle 102 to the own vehicles 104. In such examples, the central own vehicle 405 is configured to determine the indication of trustworthiness based on multiple determinations about the validity of horizontal position information in ADS-B messages from the source vehicle 102. If it is determined that the horizontal position information from multiple ADS-B messages from the source vehicle 102 is not valid, then the central own vehicle 405 is configured to provide an indication that the source vehicle 102 is not trustworthy and information from the source vehicle 102 should not be used by the own vehicles 104 for navigation. The evaluation of trustworthiness can be on-going such that the trustworthiness of the source vehicle 102 is determined over a period of time and reevaluated.

In some examples, in addition to or instead of providing the validation information and/or trustworthiness information to the own vehicles 104, the central own vehicle 405 is configured to provide the validation information and/or trustworthiness information about the source vehicle 102 to a third party that is separate and distinct from the own vehicles 104. In some examples, the validation information can be uploaded from the central own vehicle 405 to a server that can be accessed by the third party via an interface. In some examples, the third party can be a subscriber to a traffic information service that relies on validation information provided by the central own vehicle 405. In other examples, the third party can be a government or intelligence entity (for example, that controls the own vehicles 104 and the central own vehicle 405 or its allies). It should be understood that at least one of the own vehicles 104 can also obtain the validation information and/or trustworthiness information via the server in addition to, or instead of, obtaining the validation information and/or trustworthiness information via a communication link, such as the wireless communication link 411.

While not shown in FIG. 4, it should be understood that the system 400 can also include the ground station 106. In the example shown in FIG. 5, the memory 506 of the central own vehicle 405 also includes navigation instructions 522. When executing the navigation instructions 522, the one or more processors 504 are configured to process control signals received from the ground station 106. In some examples, the control signals provide navigation guidance to the central own vehicle 405 while the central own vehicle 405 is on the ground or in flight during a mission. In such examples, when executing the navigation instructions 522, the one or more processors 504 are configured to adapt the navigation of the central own vehicle 405 in view of the validation information and/or trustworthiness in addition to the control signals.

In some examples, a combined system that includes the central own vehicle 405 and the ground station 106 can be utilized. In such examples, the central own vehicle 405 and/or the ground station 106 can be used for validating the ADS-B messages from the source vehicle 102. The validation information and/or trustworthiness information can be provided to the own vehicles 104 and/or third parties from the central own vehicle 405 and/or the ground station 106.

FIG. 6 illustrates a flow diagram of an example method 600 of ADS-B validation using airborne vehicles. The common features discussed above with respect to the example systems in FIGS. 1-5 can include similar characteristics to those discussed with respect to method 600 and vice versa. In some examples, the blocks of the method 600 are performed by ground station 106 or central own vehicle 405 described above.

The blocks of the flow diagram in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel in an event-driven manner).

The method 600 includes receiving timestamped ADS-B data and determined positions from own vehicles (block 602). In some examples, the timestamped ADS-B data and determined positions are received over a datalink connection. In some examples, the timestamped ADS-B data includes horizontal position information, altitude information, and an identifier of a source vehicle that transmitted the ADS-B message that the timestamped ADS-B data is generated from. In some examples, additional information in the ADS-B message from the source vehicle beyond horizontal position information, altitude information, and an identifier of a source vehicle is also provided with the timestamped ADS-B data and the determined positions from the own vehicles.

The method 600 further includes determining differences between timestamps of the timestamped ADS-B data (block 604). In some examples, determining the difference between the timestamps of the timestamped ADS-B data includes determining the time difference of arrival at each of the own vehicles.

The method 600 further includes extracting altitude information from the timestamped ADS-B data (block 606). The extracted altitude information is trusted and not validated using the techniques described herein.

The method 600 further includes estimating horizontal position of the first vehicle based on the differences between timestamps, the determined positions from the own vehicles, and the extracted altitude information (block 608). In some examples, the horizontal position of the first vehicle is determined using triangulation techniques. In some examples, the set of equations for each of the own vehicles can be solved using a linear iterative least squares method or other suitable techniques for estimating the horizontal position of the source vehicle.

The method 600 further includes determining whether horizontal position information in the ADS-B message from the first vehicle is valid (block 610). In some examples, determining whether horizontal position information in the ADS-B message from the first vehicle is valid includes determining whether a difference between the estimated horizontal position of the first vehicle and the horizontal position information in the ADS-B message from the first vehicle exceeds a threshold. In some examples, the threshold is adaptable and based on integrity and/or accuracy information in the ADS-B message from the first vehicle and/or the application for which the information in the ADS-B message is to be used.

By using the techniques described herein, the ADS-B messages received by vehicles can be validated without requiring specific components (for example, separate ground station) or dedicated hardware to do the validation. The information about the validated ADS-B messages and the trustworthiness of the source vehicle generally is useful for maintaining self-separation and even for detect-and-avoid systems and algorithms. Further, by validating only the horizontal position information in the ADS-B messages, rather than also validating the altitude information, the techniques described herein do not provide potentially misleading information to the own vehicles about validating the altitude information, and the precision of the estimation of the horizontal position of the source vehicle is improved. Overall, the techniques described herein provide a reliable and cost-effective solution for validating ADS-B messages that can be implemented on a large variety of vehicles and provide valuable information for those vehicles and the community.

In various aspects, system elements or examples described throughout this disclosure (such as the system or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The techniques described here may be implemented in digital electronic circuitry, or with a programmable processor (for example, a special-purpose processor or a general-purpose processor such as a computer), firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Example Embodiments

Example 1 includes a system, comprising: multiple vehicles that are time synchronized, wherein each respective vehicle of the multiple vehicles is configured to: receive an Automatic Dependent Surveillance-Broadcast (ADS-B) message from a first vehicle; generate respective timestamped ADS-B data from the ADS-B message received from the first vehicle, wherein the respective timestamped ADS-B data includes a timestamp that indicates a time of reception of the ADS-B message at the respective vehicle, an identifier of the first vehicle, horizontal position information, and altitude information; determine a position of the respective vehicle at the time of reception of the ADS-B message at the respective vehicle; and transmit the timestamped ADS-B data and the determined position of the respective vehicle via a datalink connection to a second vehicle or a ground station; wherein the second vehicle or the ground station is configured to: receive, from each of the multiple vehicles, the timestamped ADS-B data and the determined position of the respective vehicle; determine differences in the timestamps for the timestamped ADS-B data from the multiple vehicles; extract the altitude information from the timestamped ADS-B data; determine an estimated horizontal position of the first vehicle based on the differences in timestamps for the timestamped ADS-B data from the multiple vehicles, the determined positions for the multiple vehicles, and the extracted altitude information; and determine whether the horizontal position information in the ADS-B message from the first vehicle is valid based on a comparison of the estimated horizontal position of the first vehicle and the horizontal position information of the first vehicle in the ADS-B message.

Example 2 includes the system of Example 1, wherein each respective vehicle of the multiple vehicles is configured to transmit the timestamped ADS-B data and the determined position to the second vehicle.

Example 3 includes the system of any of Examples 1-2, wherein the ground station is configured to provide control signals to the multiple vehicles over the datalink connection, wherein the control signals provide instructions for navigation for the multiple vehicles.

Example 4 includes the system of any of Examples 1-3, wherein the ground station is also configured to: receive the ADS-B message from the first vehicle; timestamp the ADS-B message with a timestamp to generate additional timestamped ADS-B data, wherein the timestamp indicates a time of reception of the ADS-B message at the ground station; and determine a position of the ground station at the time of reception of the ADS-B message; and wherein the ground station is configured to determine the estimated horizontal position of the first vehicle further based on the additional timestamped ADS-B data and the position of the ground station.

Example 5 includes the system of any of Examples 1-4, wherein the second vehicle or ground station is further configured to provide an indication of trust of the first vehicle to the multiple vehicles based on the determination of whether the horizontal position information in the ADS-B message from the first vehicle is valid.

Example 6 includes the system of any of Examples 1-5, wherein the multiple vehicles are time synchronized by disciplining internal clocks of the multiple vehicles based on Global Navigation Satellite System (GNSS) signals.

Example 7 includes the system of any of Examples 1-5, wherein the multiple vehicles are time synchronized by disciplining internal clocks of the multiple vehicles based on cellular communication network signals.

Example 8 includes a method of validating Automatic Dependent Surveillance-Broadcast (ADS-B), comprising: receiving, from multiple vehicles that are time synchronized, ADS-B data with a timestamp, wherein the ADS-B data includes an identifier of a first vehicle that sent an ADS-B message, horizontal position information in the ADS-B message, and altitude information in the ADS-B message, wherein the timestamp defines a time of reception of the ADS-B message from the first vehicle by the respective vehicle; receiving, from each of the multiple vehicles, a determined position of the respective vehicle at the time of reception of the ADS-B message from the first vehicle; determining differences in time of arrival for the ADS-B message from the first vehicle to each of the multiple vehicles; extracting the altitude information from the ADS-B data; determining an estimated horizontal position of the first vehicle based on the differences in time of arrival, the determined positions received from each of the multiple vehicles, and the extracted altitude information; and determining whether the horizontal position information in the ADS-B message from the first vehicle is valid based on a comparison of the estimated horizontal position of the first vehicle and the horizontal position information in the ADS-B message from the first vehicle.

Example 9 includes the method of Example 8, wherein the multiple vehicles are time synchronized using Global Navigation Satellite System (GNSS) signals.

Example 10 includes the method of any of Examples 8-9, further comprising comparing a difference between the estimated horizontal position of the first vehicle and horizontal position information provided in the ADS-B message from the first vehicle to a threshold based on integrity and/or accuracy information in the ADS-B message.

Example 11 includes the method of any of Examples 8-10, wherein the method is repeated over time to determine whether ADS-B messages from the first vehicle can be used for detect-and-avoid systems or self-separation systems of the multiple vehicles.

Example 12 includes the method of any of Examples 8-11, wherein the method is performed at a ground station.

Example 13 includes the method of any of Examples 8-12, wherein the method is performed onboard one of the multiple vehicles.

Example 14 includes the method of any of Examples 8-13, wherein the multiple vehicles include at least three vehicles, wherein determining the estimated horizontal position of the first vehicle includes using triangulation.

Example 15 includes the method of any of Examples 8-14, further comprising providing validation information to the multiple vehicles or a third-party based on the determination of whether the ADS-B data from the first vehicle is valid in response to determining whether the horizontal position information in the ADS-B message from the first vehicle is valid.

Example 16 includes a ground station, comprising: one or more receivers configured to receive respective timestamped ADS-B data and respective position information from multiple vehicles, wherein the respective timestamped ADS-B data from each respective vehicle includes a respective timestamp indicating a time when the respective vehicle received an ADS-B message from a first vehicle, wherein the respective position information from each respective vehicle includes a position of the respective vehicle at the time when the respective vehicle received the ADS-B message from the first vehicle; and one or more processors communicatively coupled to the one or more receivers and a memory, wherein the one or more processors are configured to: determine differences in the respective timestamps for the respective timestamped ADS-B data from the multiple vehicles; extract altitude information from the timestamped ADS-B data; determine an estimated horizontal position of the first vehicle based on the differences in the respective timestamps for the respective timestamped ADS-B data from the multiple vehicles, the respective positions for the multiple vehicles, and the extracted altitude information; and determine whether horizontal position information in the timestamped ADS-B data is valid based on a comparison of the estimated horizontal position of the first vehicle and the horizontal position information in the timestamped ADS-B data.

Example 17 includes the ground station of Example 16, further comprising an ADS-B In receiver configured to receive the ADS-B message from the first vehicle; wherein the one or more processors are further configured to generate additional timestamped ADS-B data from the ADS-B message received from the first vehicle, wherein the additional timestamped ADS-B includes an additional timestamp that indicates a time of reception of the ADS-B message at the ground station; and wherein the determination of the estimated horizontal position of the first vehicle is further based on differences in the respective timestamps and the additional timestamp and a known position of the ground station.

Example 18 includes the ground station of any of Examples 16-17, further comprising one or more transmitters configured to transmit navigation control signals to the multiple vehicles.

Example 19 includes the ground station of any of Examples 16-18, further comprising one or more transmitters configured to transmit validation information about the first vehicle to the multiple vehicles in response to the determination of whether horizontal position information in the timestamped ADS-B data is valid.

Example 20 includes the ground station of any of Examples 16-19, wherein the ground station is configured to provide validation information about the first vehicle to a third-party that is separate and distinct from the multiple vehicles in response to the determination of whether horizontal position information in the timestamped ADS-B data is valid.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system, comprising:

multiple vehicles that are time synchronized, wherein each respective vehicle of the multiple vehicles is configured to:

receive an Automatic Dependent Surveillance-Broadcast (ADS-B) message from a first vehicle of the multiple vehicles;

generate respective timestamped ADS-B data from the ADS-B message received from the first vehicle, wherein the respective timestamped ADS-B data includes a timestamp that indicates a time of reception of the ADS-B message at the respective vehicle, an identifier of the first vehicle, horizontal position information of the first vehicle, and altitude information of the first vehicle;

determine a position of the respective vehicle at the time of reception of the ADS-B message at the respective vehicle; and transmit the timestamped ADS-B data and the determined position of the respective vehicle via a datalink connection to a second vehicle or a ground station;

wherein the second vehicle or the ground station is configured to:

receive, from each of the multiple vehicles, the timestamped ADS-B data and the determined position of the respective vehicle;

determine differences in the timestamps for the timestamped ADS-B data from the multiple vehicles;

extract the altitude information from the timestamped ADS-B data;

determine an estimated horizontal position of the first vehicle based on the differences in timestamps for the timestamped ADS-B data from the multiple vehicles, the determined positions for the multiple vehicles, and the extracted altitude information; and determine whether the horizontal position information in the ADS-B message from the first vehicle is valid based on a comparison of the estimated horizontal position of the first vehicle and the horizontal position information of the first vehicle in the ADS-B message.

2. The system of claim 1, wherein each respective vehicle of the multiple vehicles is configured to transmit the timestamped ADS-B data and the determined position to the second vehicle.

3. The system of claim 1, wherein the ground station is configured to provide control signals to the multiple vehicles over the datalink connection, wherein the control signals provide instructions for navigation for the multiple vehicles.

4. The system of claim 1, wherein the ground station is also configured to:

receive the ADS-B message from the first vehicle;

timestamp the ADS-B message with a timestamp to generate additional timestamped ADS-B data, wherein the timestamp indicates a time of reception of the ADS-B message at the ground station; and determine a position of the ground station at the time of reception of the ADS-B message; and wherein the ground station is configured to determine the estimated horizontal position of the first vehicle further based on the additional timestamped ADS-B data and the position of the ground station.

5. The system of claim 1, wherein the second vehicle or ground station is further configured to provide an indication of trust of the first vehicle to the multiple vehicles based on the determination of whether the horizontal position information in the ADS-B message from the first vehicle is valid.

6. The system of claim 1, wherein the multiple vehicles are time synchronized by disciplining internal clocks of the multiple vehicles based on Global Navigation Satellite System (GNSS) signals.

7. The system of claim 1, wherein the multiple vehicles are time synchronized by disciplining internal clocks of the multiple vehicles based on cellular communication network signals.

8. A method of validating Automatic Dependent Surveillance-Broadcast (ADS-B), comprising:

receiving, from multiple vehicles that are time synchronized, ADS-B data with a timestamp, wherein the ADS-B data includes an identifier of a first vehicle that sent an ADS-B message, horizontal position information in the ADS-B message, and altitude information in the ADS-B message, wherein the timestamp defines a time of reception of the ADS-B message from the first vehicle by each respective vehicle of the multiple vehicles;

receiving, from each of the multiple vehicles, a determined position of the respective vehicle at the time of reception of the ADS-B message from the first vehicle;

determining differences in time of arrival for the ADS-B message from the first vehicle to each of the multiple vehicles;

extracting the altitude information from the ADS-B data;

determining an estimated horizontal position of the first vehicle based on the differences in time of arrival, the determined positions received from each of the multiple vehicles, and the extracted altitude information; and determining whether the horizontal position information in the ADS-B message from the first vehicle is valid based on a comparison of the estimated horizontal position of the first vehicle and the horizontal position information in the ADS-B message from the first vehicle.

9. The method of claim 8, wherein the multiple vehicles are time synchronized using Global Navigation Satellite System (GNSS) signals.

10. The method of claim 8, further comprising comparing a difference between the estimated horizontal position of the first vehicle and horizontal position information provided in the ADS-B message from the first vehicle to a threshold based on integrity and/or accuracy information in the ADS-B message.

11. The method of claim 8, wherein the method is repeated over time to determine whether ADS-B messages from the first vehicle can be used for detect-and-avoid systems or self-separation systems of the multiple vehicles.

12. The method of claim 8, wherein the method is performed at a ground station.

13. The method of claim 8, wherein the method is performed onboard one of the multiple vehicles.

14. The method of claim 8, wherein the multiple vehicles include at least three vehicles, wherein determining the estimated horizontal position of the first vehicle includes using triangulation.

15. The method of claim 8, further comprising providing validation information to the multiple vehicles or a third-party based on determining whether the ADS-B data from the first vehicle is valid in response to determining whether the horizontal position information in the ADS-B message from the first vehicle is valid.

16. A ground station, comprising:

one or more receivers configured to receive respective timestamped ADS-B data and respective position information from multiple vehicles, wherein the respective timestamped ADS-B data from each respective vehicle includes a respective timestamp indicating a time when the respective vehicle received an ADS-B message from a first vehicle, wherein the respective position information from each respective vehicle includes a position of the respective vehicle at the time when the respective vehicle received the ADS-B message from the first vehicle; and one or more processors communicatively coupled to the one or more receivers and a memory, wherein the one or more processors are configured to:

determine differences in the respective timestamps for the respective timestamped ADS-B data from the multiple vehicles;

extract altitude information from the timestamped ADS-B data;

determine an estimated horizontal position of the first vehicle based on the differences in the respective timestamps for the respective timestamped ADS-B data from the multiple vehicles, the respective positions for the multiple vehicles, and the extracted altitude information; and determine whether horizontal position information in the timestamped ADS-B data is valid based on a comparison of the estimated horizontal position of the first vehicle and the horizontal position information in the timestamped ADS-B data.

17. The ground station of claim 16, further comprising an ADS-B In receiver configured to receive the ADS-B message from the first vehicle;

wherein the one or more processors are further configured to generate additional timestamped ADS-B data from the ADS-B message received from the first vehicle, wherein the additional timestamped ADS-B data includes an additional timestamp that indicates a time of reception of the ADS-B message at the ground station; and wherein determining the estimated horizontal position of the first vehicle is further based on differences in the respective timestamps and the additional timestamp and a known position of the ground station.

18. The ground station of claim 16, further comprising one or more transmitters configured to transmit navigation control signals to the multiple vehicles.

19. The ground station of claim 16, further comprising one or more transmitters configured to transmit validation information about the first vehicle to the multiple vehicles in response to determining whether horizontal position information in the timestamped ADS-B data is valid.

20. The ground station of claim 16, wherein the ground station is configured to provide validation information about the first vehicle to a third-party that is separate and distinct from the multiple vehicles in response to determining whether horizontal position information in the timestamped ADS-B data is valid.

* * * * *